L. A. JENNINGS.
LOCK NUT.
APPLICATION FILED MAY 21, 1914.
1,132,521.
Patented Mar. 16, 1915.
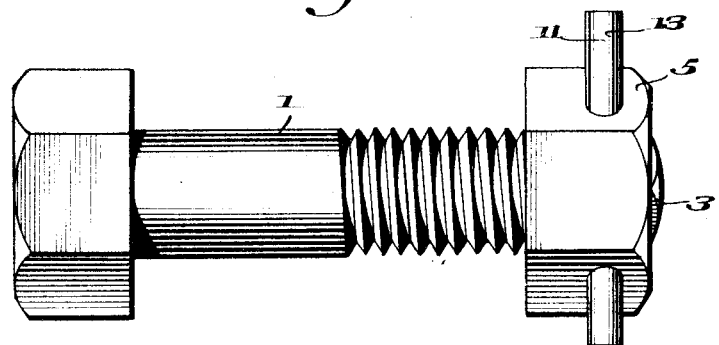
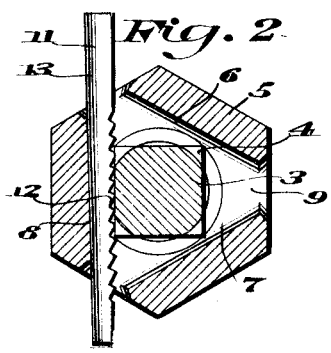
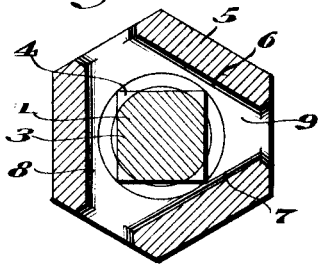
Inventor
A. Jennings
Witnesses
By Victor J. Evans
Attorney

UNITED STATES PATENT OFFICE.

LUTHER A. JENNINGS, OF BURKESVILLE, KENTUCKY.

LOCK-NUT.

1,132,521.

Specification of Letters Patent.  Patented Mar. 16, 1915.

Application filed May 21, 1914. Serial No. 840,095.

*To all whom it may concern:*

Be it known that I, LUTHER A. JENNINGS, a citizen of the United States, residing at Burkesville, in the county of Cumberland and State of Kentucky, have invented new and useful Improvements in Lock-Nuts, of which the following is a specification.

This invention relates to improvements in means for locking a nut and bolt to prevent their accidental separation.

One of the objects of the invention is to provide a lock comprising a key which shall be inserted through an opening in a nut to engage with the threads of the bolt, upon which the nut is screwed to removably sustain the nut and bolt connected.

A further object of the invention is to provide a bolt having a square end with a nut that is approximately centrally formed with three angularly disposed passages that open into the bore of the nut, and to further provide a switch key which is adapted to be inserted through one of the passages to contact with the wall of the said passage and one of the square faces at the end of the bore, and so retain the nut and bolt in locked position.

With the foregoing objects in view and others which will appear as the details of the construction and the arrangement of parts are fully understood, the improvement resides in the construction, combination and arrangement of parts set forth in the following specification and falling within the scope of the appended claims.

The accompanying drawings illustrate a satisfactory reduction of the improvement to practice, and in the said drawings: Figure 1 is an elevation showing the nut locked upon the squared end of the bolt, Fig. 2 is a sectional view on the line 2—2 of Fig. 1, Fig. 3 is a similar sectional view with the key removed.

Referring now to the drawings in detail, the numeral 1 designates a bolt having a threaded shank 2, the end of which being angular or square in cross section, as indicated by the numeral 3, and the corners of the said squared end are provided with teeth 4 which are continuations of the main teeth upon the shank 2, or, in other words, the end 3 is provided by filing or otherwise cutting into the teeth at the end of the nut to form a number of flat or square faces with the threads at the corners thereof not interrupted.

The numeral 5 designates a nut which is provided with a number of sides or faces, and is preferably hexagonal or formed with six angular sides or faces, and the said nut is adapted to be screwed upon the bolt 1. The nut adjacent one of its ends is formed with a plurality of angularly disposed intersecting passages, preferably three in number, and indicated by the numerals 6, 7 and 8 respectively. These passages each intersect the threaded bore of the nut, and their arrangement is such as to provide the interior of the nut with two oppositely disposed flat or straight faces 9 and 10 provided by the intersecting passages.

The numeral 11 designates a wedge key which is provided for securing the nut upon the bolt. The key has, what I will term, its inner face or the face thereof which is adapted to engage with the bolt flat and provided with teeth 12. The outer or opposite face of the key is round, as at 13, and what may be termed the outer walls of the passages are likewise round. The key 11 is constructed of some hardened material which, however, may be ductile under the hammer, so that the ends of the said key may be bent against the opposite faces or sides of the nut to sustain the key upon the nut, if desired.

By reference to Figs. 2 and 3 of the drawings it will be noted that the nut arranged upon the bolt has only one of its passages, 8, uninterrupted by the corners 4 of the squared or angular end 3 of the nut, and it will be noted that the reduced end of the key can be forced through only the said passage 8 as an attempt to insert the said key in either of the remaining passages 6 or 7 would be prevented by the corners 4 of the bolt with which the end of the key would contact. As has been stated the end of the key may be bent over the face or side of the nut to sustain the said key against accidental removal, but, the teeth 12 contacting with the squared face of the end of the nut and necessarily with the threaded corners of the said squared face will, under ordinary conditions, effectively sustain the key in locked position.

Having thus described the invention, what I claim is:

In a lock nut, in combination with a bolt, said bolt having a squared end, of a nut formed with three angularly disposed intersecting passages that open into the bore of the nut, and a wedge key member inserted through one of the passages and contacting with the wall thereof and one of the squared faces at the end of the bolt.

In testimony whereof I affix my signature in presence of two witnesses.

LUTHER A. JENNINGS.

Witnesses:
J. W. COLLINS,
JOHN G. TALBOT.